United States Patent
Amerga et al.

(10) Patent No.: US 8,527,014 B2
(45) Date of Patent: Sep. 3, 2013

(54) SLEEP MODE FOR WIRELESS COMMUNICATION DEVICE DURING OUT OF SERVICE OPERATION

(75) Inventors: Messay Amerga, San Diego, CA (US);
Bhupesh Umatt, San Diego, CA (US);
Vineet Mittal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 716 days.

(21) Appl. No.: 11/283,100

(22) Filed: Mar. 6, 2006

(65) Prior Publication Data
US 2007/0207841 A1     Sep. 6, 2007

Related U.S. Application Data

(60) Provisional application No. 60/706,725, filed on Aug. 8, 2005.

(51) Int. Cl.
*H04M 1/00* (2006.01)

(52) U.S. Cl.
USPC ..... 455/574; 455/422.1; 455/434; 455/435.2; 455/435.3; 455/229

(58) Field of Classification Search
None
See application file for complete search history.

(56) References Cited

U.S. PATENT DOCUMENTS

| | | | | |
|---|---|---|---|---|
| 5,524,280 A | * | 6/1996 | Douthitt et al. | 455/62 |
| 6,011,960 A | * | 1/2000 | Yamada et al. | 455/77 |
| 6,073,035 A | * | 6/2000 | Witter | 455/574 |
| 6,185,423 B1 | | 2/2001 | Brown et al. | |
| 6,272,343 B1 | * | 8/2001 | Pon et al. | 455/434 |
| 2002/0093920 A1 | * | 7/2002 | Neufeld et al. | 370/311 |
| 2002/0177441 A1 | * | 11/2002 | Ida et al. | 455/434 |
| 2004/0023634 A1 | * | 2/2004 | Jeong et al. | 455/403 |
| 2005/0064869 A1 | * | 3/2005 | Ansorge | 455/435.2 |

FOREIGN PATENT DOCUMENTS

| | | |
|---|---|---|
| EP | 0743763 A2 | 11/1996 |
| JP | 1998336724 | 12/1998 |
| JP | 2003023665 | 1/2003 |
| KR | 10-2005-0019307 * | 3/2005 |
| KR | 100730548 | 6/2007 |
| WO | 2004032479 A2 | 4/2004 |
| WO | 2004042941 A1 | 5/2004 |
| WO | WO2004054142 | 6/2004 |

OTHER PUBLICATIONS

International Search Report and Written Opinion—PCT/US2006/031148, International Search Authority—European Patent Office—Nov. 29, 2006.

* cited by examiner

*Primary Examiner* — Zhiyu Lu
(74) *Attorney, Agent, or Firm* — S. Hossain Beladi

(57) ABSTRACT

The disclosure is directed to techniques for performing service signal searches with reduced power consumption when a wireless communication device is operating out of service. The techniques include placing the wireless communication device in a "deep sleep" mode when the wireless communication device is not in service. When operating in the deep sleep mode, the wireless communication device reduces power consumption by not looking for paging signals or searching for service signals. The wireless communication device then may periodically enter a wake-up period during which power consumption is increased to perform signal searches in one or more frequency bands. The wireless communication device returns to the deep sleep mode when the signal searches are unsuccessful.

41 Claims, 5 Drawing Sheets

SLEEP MODE FOR WIRELESS COMMUNICATION DEVICE DURING OUT OF SERVICE OPERATION

RELATED APPLICATIONS

The present application claims priority to provisional U.S. Application Ser. No. 60/706,725, entitled "TECHNIQUES FOR WCDMA SIGNAL SEARCH WHILE HANDSET IS OPERATING OUT OF SERVICE," filed Aug. 8, 2005 assigned to the assignee hereof and incorporated herein by reference.

TECHNICAL FIELD

The disclosure relates generally to wireless communication, and more particularly to out-of-service operation in a wireless communication device.

BACKGROUND

Several different wireless communication techniques have been developed, including frequency division multiple access (FDMA), time division multiple access (TDMA) and various spread spectrum techniques. One common spread spectrum technique used in wireless communication is code division multiple access (CDMA) signal modulation in which multiple communications are simultaneously transmitted over a spread spectrum radio-frequency (RF) signal. Several mobile communication protocols use CDMA signal modulation, such as the CDMA family of standards and wideband CDMA (W-CDMA) family of standards.

Conserving power in a wireless communication device (WCD) is a paramount concern, as the WCD is typically powered by limited battery resources. To conserve power, the WCD may periodically operate in a low-power mode, often referred to as "standby" mode. When operating in standby mode, the wireless communication device reduces power consumption by disconnecting power to selected internal components. Slotted paging techniques have been developed, in which paging signals are sent from a base station to WCDs within assigned paging slots, separated by predetermined intervals of time. Slotted paging allows a WCD to operate in standby mode during the period of time between consecutive paging slots without missing paging signals.

When a WCD device operates out of service, however, the wireless communication device is unable to receive any service signals from base stations. An out-of-service condition may occur upon initial power-up or upon a loss of service during normal operation. In either case, the WCD is unable to operate in standby mode as it does not know when or in which frequency band to look for paging signals. Instead, the WCD constantly searches for a service signal in both frequency and code space. A constant search state substantially increases power consumption and quickly drains battery resources in the WCD.

SUMMARY

In general, the disclosure is directed to techniques for performing service signal searches with reduced power consumption when a WCD is operating out of service. The techniques may be especially applicable to CDMA or W-CDMA system. The techniques include placing the WCD in a "deep sleep" mode when the WCD is not in service and has not identified a service signal. When operating in the deep sleep mode, the WCD reduces power consumption by not searching for service signals. The wireless communication device periodically enters a wake-up period, however, during which power consumption is increased to perform service signal searches in one or more frequency bands supported by the WCD. The WCD returns to the deep sleep mode when the signal searches are unsuccessful, and is removed from the deep sleep mode with the signal searches are successful.

During the wake-up period, the WCD applies intelligent search techniques designed to locate service signals efficiently with reduced power consumption. The search techniques permit the WCD to recuperate service quickly while preserving battery life. For example, upon entering the wake-up period, the WCD may first perform an acquisition database scan to search for a service signal. The acquisition database may include preloaded channels and dynamically learned channels, e.g., channels on which the WCD previously received service. The frequency band in which the dynamically learned channels reside may be given priority over other frequency bands when searching for a service signal, resulting in more rapid location of service signals in some instances.

In addition, the WCD may intermittently perform a full frequency scan to search for a service signal. A full frequency scan may involve an exhaustive search of the entire service band, and can consume a relatively large amount of time and power resources compared to an acquisition database scan. Limiting the number of times the full frequency scan is performed may reduce power consumption in the WCD by reducing the amount of time the WCD is awake. In addition, the WCD may apply a timer to further control the times at which full frequency scans are performed. The number and timing of the full frequency scans may be subject to a set of rules designed to reduce power consumption and thereby prolong WCD operation.

In one embodiment, the disclosure provides a method comprising placing a wireless communication device in a deep sleep mode to reduce power consumption in the wireless communication device when operating out of service, periodically increasing power in the wireless communication device to initiate one or more wake-up periods, performing a service signal search in one or more frequency bands supported by the wireless communication device during the wake-up periods, and returning the wireless communication device to the deep sleep mode when the service signal search is unsuccessful.

In another embodiment, the disclosure provides computer-readable medium comprising instructions that cause a processor to place a wireless communication device in a deep sleep mode to reduce power consumption in the wireless communication device when operating out of service, periodically increase power in the wireless communication device to initiate one or more wake-up periods, perform a service signal search in one or more frequency bands supported by the wireless communication device during the wake-up periods, and return the wireless communication device to the deep sleep mode when the service signal search is unsuccessful.

In an additional embodiment, the disclosure provides a wireless communication device comprising a controller that places a wireless communication device in a deep sleep mode to reduce power consumption in the wireless communication device when operating out of service, periodically increases power in the wireless communication device to initiate one or more wake-up periods, performs a service signal search in one or more frequency bands supported by the wireless communication device during the wake-up periods, and returns the wireless communication device to the deep sleep mode when the service signal search is unsuccessful.

The techniques described herein may be implemented in hardware, software, firmware, or any combination thereof. If implemented in software, the techniques may be realized in part by a computer readable medium comprising program code containing instructions that, when executed, performs one or more of the methods described herein.

The details of one or more embodiments are set forth in the accompanying drawings and the description below. Other features and advantages will be apparent from the description and drawings, and from the claims.

DETAILED DESCRIPTION

Figure 1:
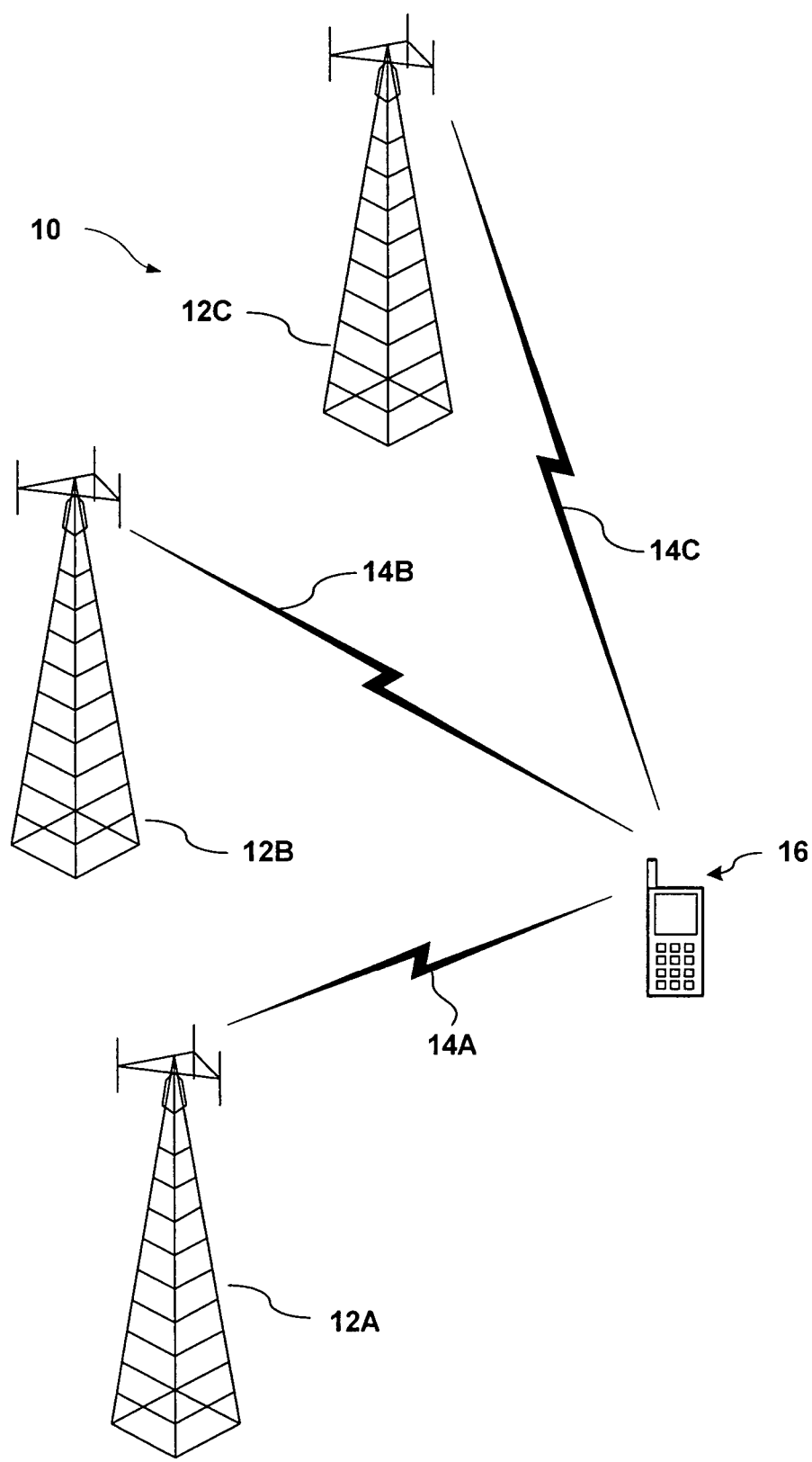
FIG. 1 is a block diagram illustrating an example wireless communication system.

FIG. 1 is a block diagram illustrating an exemplary wireless communication system 10. As shown in FIG. 1, system 10 may include one or more base stations 12A, 12B, 12C (collectively signals 12) that transmit and receive signals 14A, 14B, 14C (collectively signals 14) to and from a wireless communication device (WCD) 16 via one or more paths. As will be described, WCD 16 performs service signal searches with reduced power consumption when the WCD is operating out of service following either initial power-up or a service loss. A service signal may refer to a paging channel or pilot channel signal, or any other signal useful in identifying and connecting with a particular base station 12.

When a service signal cannot be located, WCD 16 enters a deep sleep mode to conserve power between service signal searches. In the deep sleep mode, WCD 16 does not search for service signals. In this manner, the deep sleep mode serves to conserve power in WCD 16. Accordingly, a deep sleep mode may refer to any operational mode in which WCD 16 is not actively searching for service signals. The deep sleep mode may further include operational modes in which a substantial portion of the circuitry within the WCD 16 is inactivated, powered down, or placed in suspended or hibernation state. In general, WCD 16 does not consume power at levels ordinarily associated with service signal searching operations.

A number of rules and conditions may be applied to control the behavior of WCD 16 in an out of service condition. The rules and conditions may specify the number of service signal searches to be attempted before WCD 16 goes into deep sleep, types of scans (e.g., acquisition database or full frequency scan) to be performed by the WCD to gain service on periodic wake-ups from deep sleep, time intervals to be observed between successive full frequency scans, and particular bands scanned during each wake-up period. A wake-up period may refer to an operational mode in which WCD 16 activates sufficient electronic circuitry to carry out at least limited service signal searches. During a wake-up period, other circuitry not essential to service signal searching may be activated or remain in a sleep mode.

System 10 may be designed to support one or more wireless communication technologies such as code division multiple access (CDMA), frequency division multiple access (FDMA), time division multiple access (TDMA), or orthogonal frequency divisional multiplexing (OFDM). The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCMA operation. In addition, high data rate (HDR) technologies such as cdma2000 1×EV-DO may be used. Application to CDMA and WCDMA environments will be described for purposes of illustration. For example, system 10 may be especially useful for WCDMA communication in a UMTS environment, but should not be considered limited in its application to a wide variety of wireless communication environments.

WCD 16 may take the form of a mobile radiotelephone, a satellite radiotelephone, a wireless communication card incorporated within a portable computer, a personal digital assistant (PDA) equipped with wireless communication capabilities, or the like. Each base station 12 (sometimes referred to as a base transceiver system, or BTS) includes a base station controller (not shown) that provides an interface between base station 12 and a public switched telephone network (PSTN). Base station 12 may support a plurality of public land mobile networks (PLMNs). A communication service provider centrally operates and administers one or more PLMNs and uses base station 12 as a network hub. PLMNs may stand alone and interconnect with one another or connect to a fixed system, such as the PSTN. System 10 may include any number of WCDs and base stations.

WCD 16 communicates with one or more base stations 12 at a time. As WCD 16 moves through a region, it may terminate communication with one base station 12 and initiate communication with another base station 12 based on signal strength or error rate using a series of soft and hard handoffs. When WCD 16 is operating out of service, WCD 16 is unable to receive service signals from any base stations 12 within system 10. For example, WCD 16 may lose service when it is outside of a service range of base stations 12, or when it encounters obstacles that temporarily interrupt access to service from base stations 12. Alternatively, WCD 16 may seek service following an initial power-up.

In order to retrieve service from a base station 12, WCD 16 repeatedly searches for a service signal on which to operate. For example, WCD 16 may send a series of service requests on multiple bands in an effort to obtain service from one of base stations 12. Repeatedly performing service signal searches may significantly increase power consumption in WCD 16 and drain battery resources within WCD 16. Techniques described in this disclosure enable WCD 16 to perform service signal searches with reduced power consumption when a WCD 16 is operating out of service.

As described in more detail below, when WCD 16 experiences a service loss, it enters a "deep sleep" mode. For example, WCD 16 may enter the deep sleep mode when one or more initial service signal searches following service loss are unsuccessful. In other words, WCD 16 may initially search for a service signal following a service loss, but then enter the deep sleep mode when service cannot be obtain. When operating in the deep sleep mode, WCD 16 suspends service signal searching, and reduces power consumption by not searching for service signals.

WCD 16 periodically enters a wake-up period, however, during which power consumption is increased to perform signal searches in one or more frequency bands supported by WCD 16. WCD 16 returns to the deep sleep mode when the service signal searches are unsuccessful. However, WCD 16 terminates the deep sleep mode and returns to normal service when the service signal searches are successful.

During the wake-up period, WCD 16 applies an intelligent search technique designed to locate service signals with reduced power consumption. For example, upon entering the wake-up period, WCD 16 first performs an acquisition database scan to search for a service signal. The acquisition database may include preloaded channels and dynamically learned channels, e.g., channels on which WCD 16 previously received service. The preloaded channels may include a set of channels specified by a service provider. The dynamically learned channels may be added and updated by WCD 16 based on historical service activity. For example, if WCD 16 successfully obtained service on a particular channel in the past, that channel may be added to the acquisition database as a dynamically learned channel.

The frequency band in which the preloaded channels and dynamically learned channels reside may be given priority over other frequency bands when searching for a service signal. In some cases, priority may be given to channels from which WCD 16 most recently obtained service. In particular, higher priority may be given to the last band group on which WCD 16 obtained service. Using the acquisition database, WCD 16 narrows the service signal search based on static channel information and dynamically added historical channel information. In this manner, WCD 16 initially focuses the search on bands that are more likely to result in successful reconnection to service. The result may be greater search efficiency, and reduced power consumption.

If the acquisition database search is unsuccessful, WCD 16 may intermittently perform a full frequency scan to search for a service signal. The full frequency scan may involve an exhaustive search of the entire service band. Unfortunately, performing the full frequency scan consumes a relatively large amount of time and power resources compared to the acquisition database scan. Limiting the number of times the full frequency scan is performed may reduce power consumption in WCD 16 by reducing the amount of time the wireless communication device is awake. In some embodiments, the WCD 16 may apply a timer to further control the times at which full frequency scans are performed. Hence, the number and timing of the full frequency scans may be subject to a set of rules and conditions designed to reduce power consumption and thereby prolong WCD operation.

Figure 2:
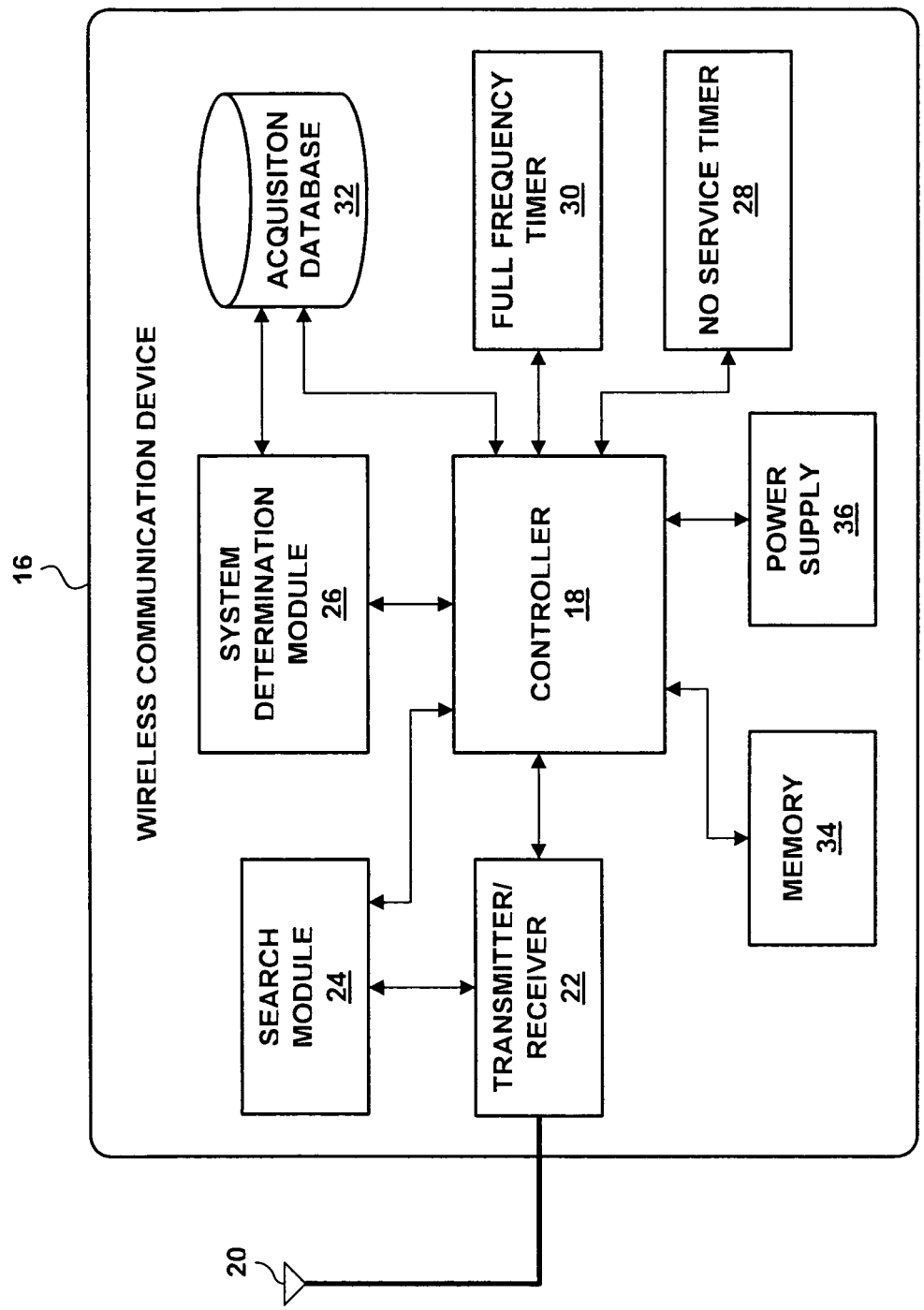
FIG. 2 is a block diagram illustrating an example wireless communication device that includes a controller capable of placing the wireless communication device in a deep sleep mode when the wireless communication device is operating out of service.

FIG. 2 is a block diagram illustrating example modules or components of a WCD 16 that includes a controller 18 capable of placing WCD 16 in a deep sleep mode when WCD 16 is operating out of service. In some cases, if applied in a UMTS environment, controller 18 may include a radio resource controller (RRC), which is a sublayer of the UMTS radio interface. WCD 16 also includes a radio frequency antenna 20, a transmitter/receiver 22, a search module 24, a system determination module 26, an acquisition database 30, a no service timer 32, a full frequency timer 34, a memory device 36, and a power supply 38. Power supply 38 typically will be battery-powered, although the techniques described herein may be applicable to devices that are not battery-powered.

Memory device 36 may store computer-readable instructions that can be executed by a processor within controller 18 to perform various aspects of the techniques described in this disclosure. Various components, such as controller 18, system determination module 26, and search module 24 of WCD 16 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry.

When WCD 16 is operating out of service, antenna 20 receives no service signals transmitted from base stations 12 on frequency bands supported by WCD 16. For example, WCD 16 may experience a service loss during normal operation, or WCD 16 may be unable to find a service signal upon power-up. Loss of service may occur when a user of WCD 16 travels outside the service area of its primary PLMN or any other PLMNs operated on frequency bands supported by WCD 16.

System determination module 26 is primarily responsible for determining which technology and service provider WCD 16 should use. System determination module 26 is also capable of determining when WCD 16 is operating out of service. System determination module 26 sends service requests to controller 18. Controller 18 then controls transmitter/receiver 22 to transmit the service requests via antenna 20 to any nearby base stations 12. For example, the service requests may include an automatic service request or a limited service request. An automatic service request seeks normal mode service from any available base station 12.

If normal mode service is not available, then a limited service request may seek limited services from any available base station 12. Limited services may include emergency wireless services. The service requests identify one or more frequency bands supported by WCD 16 in which to perform a service signal search. In some cases, system determination module 26 divides the supported frequency bands into at least two band groups. WCD 16 may support both American and European frequency bands, such as the cellular 850 MHz band, the GSM 900 MHz band, the PCS 1900 MHz band, or the IMT 2100 MHz band. System determination module 26 may divide these frequency bands into an American band group and a European band group, i.e., first and second distinct band groups.

Controller 18 is primarily responsible for lower layer signaling of WCD 16 and controlling how WCD 16 operates in a specific mode, e.g., a deep sleep mode. Upon receiving service requests from system determination module 26, controller 18 may perform an acquisition database scan on the frequency bands identified in the service requests. If the acquisition database scan is unsuccessful in finding a service signal on which to operate WCD 16, controller 18 may perform a full frequency scan on the frequency bands identified in the service requests.

Controller 18 may perform an acquisition database scan by instructing search module 24 to search for a service signal on channels of the identified frequency bands included in acquisition database 30. Search module 24 compares the frequency bands identified in the service requests to the frequency bands stored in acquisition database 30. If frequency bands identified in the service requests match frequency bands in the acquisition database 30, search module 24 initiates a scan of the matching frequency band.

Frequency bands that are identified in the service requests, but not found in acquisition database 30, are not scanned in the acquisition database scan. Acquisition database 30 stores preloaded channels, dynamically learned channels, or a combination of both. A communication service provider may enter the preloaded channels into acquisition database 30 during programming of WCD 16. The preloaded channels may comprise common channels known to provide quality service signals. The dynamically learned channels may comprise channels on which WCD 16 previously received service, and may be dynamically added to acquisition database 30 by controller 18 during normal usage of WCD 16. An acquisition database scan If the acquisition database scan for an automatic service request is unsuccessful, controller 18 may direct search module 24 to perform another acquisition database scan for a limited service request. If neither acquisition database scan is successful, controller 18 may direct search module 24 to perform a full frequency scan. In this case, search module 24 searches for a service signal on each channel of the frequency bands identified in the pertinent service request. The full frequency scan may be conducted for an automatic service request, followed by a full frequency scan for the limited service request if the full frequency scan for the automatic service request is unsuccessful.

The acquisition database scan and full frequency scan may be performed for different band groups, as will be described in greater detail below. For example, the acquisition database scan may be performed in a first band group, including channels identified in an automatic service request, followed by channels identified in a limited service request if the automatic service request is unsuccessful. Then, the acquisition database scan can be repeated for the automatic service request and limited service request, if necessary, using the second band group.

After acquisition database scans for both (or multiple) band groups have been performed, controller 18 may direct search module 24 to perform a full frequency scan for the automatic service request and limited service request, if necessary, using the first band group. This full frequency scan may be followed by another full frequency scan for the automatic service request and limited service request, if necessary, using the second band group. As an alternative, an acquisition database scan and full frequency scan may be completed for a first band group before proceeding to a database acquisition scan and full frequency scan for a second band group.

A full frequency scan may include a coarse frequency scan followed by a fine frequency scan, and then a code space search on each of the channels. As an illustration, the full frequency scan may attempt to detect a service signal in a 60 MHz wide frequency band. According to this example, the coarse frequency scan may search for a service signal in every 2 MHz wide band of the 60 MHz wide frequency band. The 2 MHz wide bands are then ranked by descending energy values as those bands with higher energy values are more likely to include a service signal. The fine frequency scan then searches for a service signal in every 2 kHz wide band of the ranked 2 MHz wide bands, and ranks the 2 kHz wide bands by descending energy values. The code space search then searches for a service signal on specific channels of the ranked 2 kHz wide bands.

If none of the service signal searches are successful, controller 18 places WCD 16 in a deep sleep mode. During the deep sleep mode, controller 18 reduces power consumption in WCD 16 by not performing service signal searches. WCD 16 may remain in the deep sleep mode for a predefined period of time. For example, WCD 16 may remain in the deep sleep mode for between approximately 30 seconds and 60 seconds. Controller 18 periodically initiates wake-up periods by increasing power in WCD 16. For example, controller 18 may instruct power supply 38 to provide additional battery power to controller 18 after operating WCD 16 in the deep sleep mode for the predefined period of time.

Upon entering a wake-up period, system determination module 26 again sends service requests to controller 18. As described above, the service requests may identify one of at least two band groups that each includes one or more frequency bands supported by WCD 16 in which to perform a service signal search. Controller 18 may receive initial service requests from system determination module 26 for one of the band groups, and receive subsequent service requests for another one of the band groups if the service signal search based on the initial service requests is unsuccessful.

In some cases, the band groups may be considered equal since WCD 16 may find a service signal on any of the band groups with equal probability. As an example, system determination module 26 may divide the supported frequency bands into two equal band groups. Controller 18 may receive service requests for the first band group during a first wake-up period and, if no service signal is found on the first band group, receive service requests for the second band group during a second wake-up period. If no service signal is found on the second band group, controller 18 may again receive service requests for the first band group during a third wake-up period.

In other cases, the band groups may be considered unequal since WCD 16 may have a higher probability of finding a service signal on one of the band groups than the other band groups. This band group may be considered a high priority band group since WCD 16 previously received service on one or more of the channels included in the band group. As an example, system determination module 26 may divide the supported frequency bands into a high priority first band group and a second band group. Controller 18 may receive a plurality of consecutive service requests for the high priority first band group during a first wake-up period.

As an illustration, controller 18 may receive approximately ten consecutive requests for the high priority first band group. Each request results in another scan attempt, which may include an acquisition database scan and a full frequency scan form automatic service requests and limited service requests. If no service signal is found on the high priority first band group in response to the first ten requests, then controller 18 may receive service requests from service determination module 26 for the second band group during a second wake-up period. If no service signal is found on the second band group, controller 18 may again receive a plurality of consecutive service requests for the high priority first band group during a third wake-up period.

Controller 18 performs one or more service signal searches in the supported frequency bands in response to the received service requests. When performing the service signal searches, antenna 20 sends outgoing signals, such as service request signals to a base station 12. When the service signal searches fail to detect a service signal on which to operate, controller 18 returns a no service signal indication to system determination module 26, in which case WCD 16 reenters the deep sleep mode or additional searching is performed.

When a service signal is found, controller 18 returns the service signal indication to system determination module 26, indicating that service is available, and removes WCD 16 from the deep sleep mode. Antenna 20 may then receive incoming signals, such as paging signals and pilot signals transmitted from the base station 12. Transmitter/receiver 22 includes circuitry to process received signals and output digital values. Consistent with conventional wireless communication devices, transmitter/receiver 22 may process the received signal using a low-noise amplifier (LNA), an RF mixer and an analog-to-digital (A/D) converter and other suitable components(not shown) to produce corresponding digital values.

Upon receiving service requests from system determination module 26 during a wake-up period, controller 18 performs an acquisition database scan on the frequency bands identified in the service requests to find a service signal on which to operate WCD 16. After a predetermined number of service requests have been received, if the acquisition database scan is unsuccessful, controller 18 performs a full frequency scan on the frequency bands identified in the service requests. In some cases, the predetermined number of service requests may be approximately twelve.

Full frequency scans consume a relatively large amount of time and power resources compared to acquisition database scans. For example, an acquisition database scan may take between approximately 0.1 seconds and 0.2 seconds to complete. In contrast, a full frequency scan may take approximately 15 seconds to complete. Therefore, controller 18 may perform a full frequency scan for only the first twelve service requests prior to entering a deep sleep mode to conserve power in WCD 16. Limiting the number of times controller 18 performs full frequency scans, may reduce power consumption in WCD 16 by reducing the amount of time WCD 16 is awake.

Once the predetermined number of service requests are received, controller 18 starts full frequency timer 34. Controller 18 may only perform acquisition database scans for the service requests during the wake-up periods until full frequency timer 34 expires. Full frequency timer 34 may run for between approximately 15 minutes and 30 minutes. When full frequency timer 34 expires, controller 18 performs a full frequency scan for the next service requests received from system determination module 26 during a wake-up period and restarts full frequency timer 34.

However, in some cases, controller 18 may determine that one or more of the frequency bands supported by WCD 16 were not scanned during the previous full frequency scan. In this case, controller 18 may then perform a full frequency scan on these unscanned frequency bands before full frequency timer 34 expires. Controller 18 may also perform a full frequency scan on frequency bands that do not have at least one channel included in acquisition database 30 before full frequency timer 34 expires.

In addition, if controller 18 performs an acquisition database scan and possibly a full frequency scan on every frequency band supported by WCD 16 and is still unable to find at least one PLMN, controller 18 starts a no service timer 32. While no service timer 32 is active, controller 18 automatically returns a no service signal in response to service requests received from system determination module 26 without performing any service signal searches. No service timer 32 may run for approximately 10 seconds. When no service timer 32 expires, controller 18 at least performs an acquisition database scan for the next service requests received from system determination module 26. Limiting the number of times controller 18 performs any service signal searches may further reduce power consumption in WCD 16.

However, in some cases, controller 18 may determine that one or more of the frequency bands supported by WCD 16 were not searched during the previous service signal searches, e.g., the previous acquisition database scan and/or the previous full frequency scan. Controller 18 may then perform at least an acquisition database scan on these unsearched frequency bands before no service timer 32 expires. Hence, full frequency timer 34 controls the rate at which full frequency scans are performed, while no service timer 32 locks out service signal searches in response to service requests for a prescribed period of time.

Figure 3:
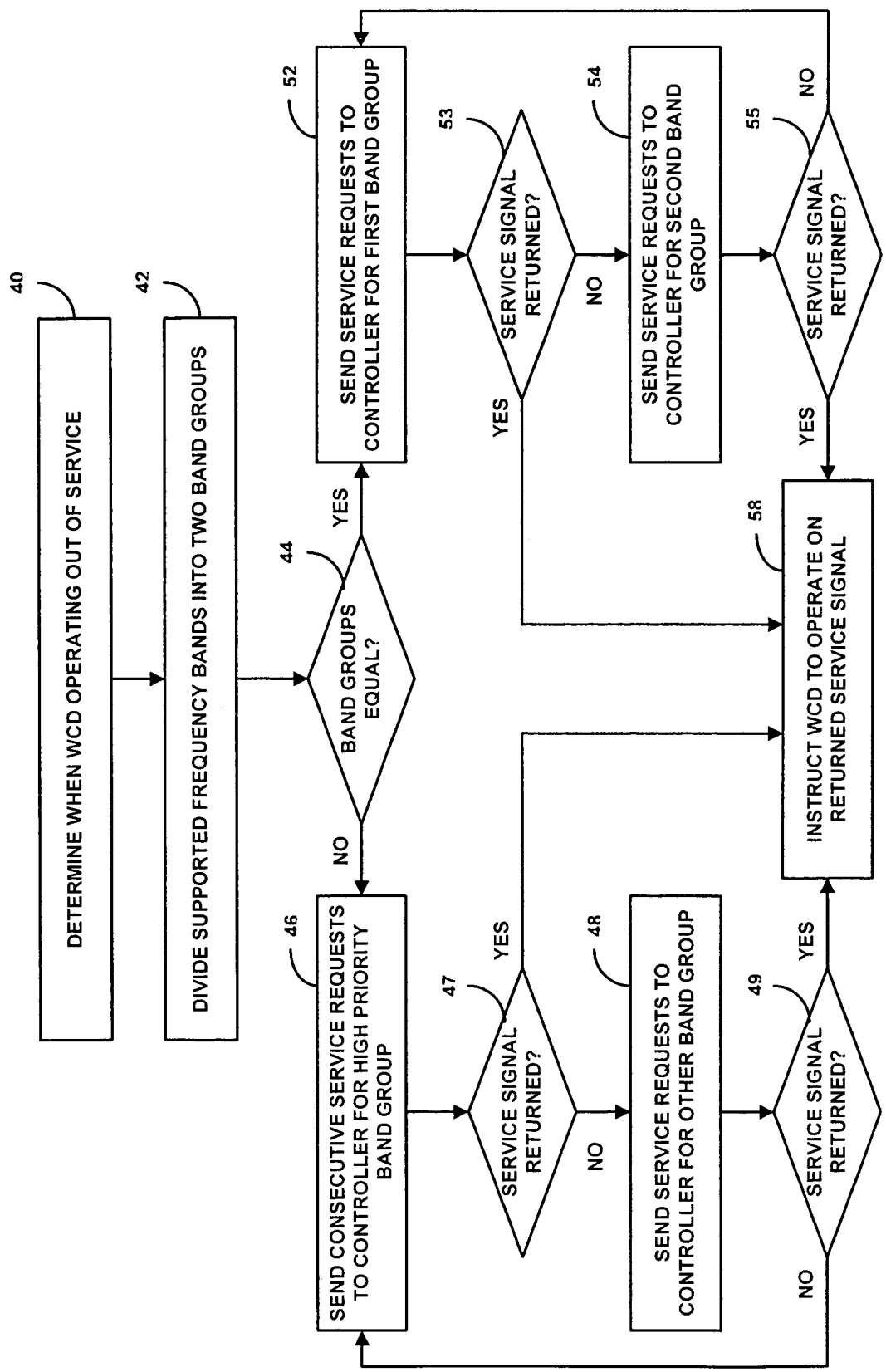
FIG. 3 is a flow chart illustrating exemplary operation of an out-of-service wireless communication device when requesting service.

FIG. 3 is a flow chart illustrating operation of an out-of-service WCD 16 when requesting service. The operation will be described herein in relation to system determination module 26 within WCD 16 of FIG. 2. System determination module 26 determines when WCD 16 is operating out of service (40). System determination module 26 then divides the frequency bands supported by WCD 16 into two band groups (42). In other embodiments, system determination module 26 may divide the supported frequency bands into more than two band groups, or rely on only a single band group.

If the band groups are equally prioritized (yes branch of 44), WCD 16 may find a service signal on either of the band groups with equal probability. For example, band groups may be considered equal when WCD 16 enters a deep sleep mode following a power-up of WCD 16. In this case, the WCD 16 may have been transported to a different geographical region between power-down and power-up, e.g., in the case of an air traveler seeking service following landing. In the case of power-up, there may be no reason to prioritize one band group over another. Alternatively, WCD 16 may enter the deep sleep mode following a service loss during active operation. For example, a user may travel outside a viable coverage region for any base stations 12. In this case, WCD 16 may give higher priority to the last band group from which service was obtained prior to service loss.

System determination module 26 sends service requests for the first band group to controller 18 of WCD 16 (52). The service requests may include automatic service requests followed by limited service requests if the automatic service requests are unsuccessful. If controller 18 fails to return a service signal from the first band group to system determination module 26 (no branch of 53), system determination module 26 sends service requests for the second band group to controller 18 of WCD 16 (54). If controller 18 fails to return a service signal of the second band group to system determination module 26 (no branch of 55), system determination module 26 again sends service requests for the first band group to controller 18 (52). If controller 18 returns a service signal for either the first band group or the second band group to system determination module 26 (yes branches of 53, 55), system determination module instructs WCD 16 to operate using the returned service signal (58).

In some cases, system determination module 26 may send the service requests for the first band group (52) during a first wake-up period and send the service requests for the second band group (54) during a second wake-up period. System determination module 26 may then send the repeated service requests for the first band group during a third wake-up period. In embodiments with more than two equal band groups, system determination module 26 may send service requests for a third band group during the third wake-up period.

If the band groups are not equal (no branch of 44), WCD 16 may have a higher probability of finding a service signal on one of the band groups. For example, the band group may include one or more of channels on which WCD 16 previously received service. System determination module 26 may then consider this band group a high priority band group. System determination module 26 sends a plurality of consecutive service requests for the high priority band group to controller 18 of WCD 16 (46). In some cases, system determination module 26 may send approximately ten consecutive service requests for the high priority band group.

If controller 18 fails to return a service signal of the high priority band group to system determination module 26 (no branch of 47), system determination module 26 sends service requests for the other band group to controller 18 of WCD 16 (48). If controller 18 fails to return a service signal of the other band group to system determination module 26 (no branch of 49), system determination module 26 again sends a plurality of consecutive service requests for the high priority band group to controller 18 (46). If controller 18 returns a service signal of either the high priority band group or the. other band group to system determination module 26 (yes branches of 47, 49), the system determination module instructs WCD 16 to operate on the returned service signal (58).

In some cases, system determination module 26 may send the plurality of consecutive service requests for the high priority band group (46) during a first wake-up period and send the service requests for the other band group (48) during a second wake-up period. System determination module 26 may then send the repeated plurality of consecutive service requests for the high priority band group during a third wake-up period. In embodiments with more than two unequal band groups, system determination module 26 may send service requests for another band group during the third wake-up period. For each band group, as mentioned previously, system determination module 26 may generate an automatic service request followed by a limited service request if the automatic service request if unsuccessful.

When WCD 16 enters the deep sleep mode following power-up, it may be assumed that all band groups are equal, i.e., that the WCD can acquire service on any band group with equal probability. In this case, as an illustration, system determination module 26 of WCD 16 may send service requests in the following order:

Automatic Service on band group 1
Limited Service on band group 1
Automatic Service on band group 2
Limited Service on band group 2
WCD enters deep sleep mode
WCD wakes up
Automatic Service on band group 1
Limited Service on band group 1
WCD enters deep sleep mode
WCD wakes up
Automatic Service on band group 2
Limited Service on band group 2

The process cycle shown above may continue on an iterative basis. The deep sleep wake up duration may vary as the cycles progress. As an illustration, the deep sleep wake up duration may be as follows:

30 seconds for first 10 cycles
45 seconds for next 10 cycles
60 seconds after first 20 cycles As shown above, each cycle may include a full service request followed by a limited service request on a particular band group. The above sequence and timing is provided for purposes of illustration, and is not to be considered limiting of the techniques described in this disclosure.

When WCD 16 enters the deep sleep mode following service loss, it may be assumed that all band groups are not equal. Rather, service determination (SD) module 26 is aware of the last band group on which WCD 16 acquired service. Hence, SD module 26 may give higher priority to that band group. As an illustration, SD module 26 initially sends 10 consecutive service requests for the last acquired band followed by service requests for the other band. Then, SD module 26 sends 4 consecutive requests on the last acquired band group followed by 1 request on the other band group. In this case, as an illustration, system determination module 26 of WCD 16 may send service requests, after the initial 10 requests, in the following order:

Automatic Service on band group 1
Limited Service on band group 1
Automatic Service on band group 1
Limited Service on band group 1
Automatic Service on band group 1
Limited Service on band group 1
Automatic Service on band group 1
Limited Service on band group 1
Automatic Service on band group 2
Limited Service on band group 2
Automatic Service on band group 1
Limited Service on band group 1
Automatic Service on band group 1
Limited Service on band group 1
Automatic Service on band group 1
Limited Service on band group 1
Automatic Service on band group 1
Limited Service on band group 1
Automatic Service on band group 2
Limited Service on band group 2

As an overview of an example process, for the first 4 service requests received by controller 18, the controller may direct search module 24 to perform an acquisition database scan followed by a full frequency scan on the bands reported by the SD module 26 as being supported by WCD 16. On the first N (e.g., 12) service requests received from SD module 26 after WCD 16 enters deep sleep, search module 24 performs an acquisition database scan followed by a full frequency scan.

Before controller 18 returns a no service indication on the $12^{th}$ service request, it starts a 30-minute full frequency scan timer 34. Until the timer 34 is active, for every service request, controller 18 will only direct an acquisition database scan. During this time, controller 18 does not direct search module 24 to perform any full frequency scans. As an exception, if no frequency is present in acquisition database 30 for a supported band received by controller 18 in a service request, controller 18 will direct search module 24 to perform a full frequency scan in the pertinent band.

Upon expiration of the full frequency scan timer, WCD 16 starts the full frequency scan timer 34 again for 30 minutes upon receiving the next service request. In this case, however, each supported band will be scanned at least once, whenever it is enabled, without regard to the full scan timer or the contents of the acquisition database. In addition, when WCD 16 is in the deep sleep mode and controller 18 receives an automatic service request, controller 18 directs search module 24 to perform an acquisition database scan on the PLMN specified in the request. If WCD 16 is unable to find service on the specified PLMN, controller 18 directs search module 24 to perform an acquisition database scan again on other PLMNs. If WCD 16 is still unable to locate service on any PLMNs, possibly after doing a full frequency scan, then before returning a no service indication, controller 18 starts a no service timer 32 of n seconds (e.g., 10 seconds).

At this point, if controller 18 receives any service request when the no service timer 32 is active, the controller will reject the service request and return a no service indication immediately. In this manner, controller 18 effectively locks out any service signal searching while the no server 32 is running. As an exception, if controller 18 receives a service request for a band that has not been searched since the start of the no service timer, controller 18 may ignore the service timer. When WCD 16 finds service for a service request received by controller 18 when the WCD is in deep sleep, controller 18 stops all active timers related to the deep sleep mode, e.g., the full frequency scan timer 34 and no service timer 32, and resets the service request cycle counter N to 0. The above sequence and timing is provided for purposes of illustration, and is not to be considered limiting of the techniques described in this disclosure.

Figure 4A:
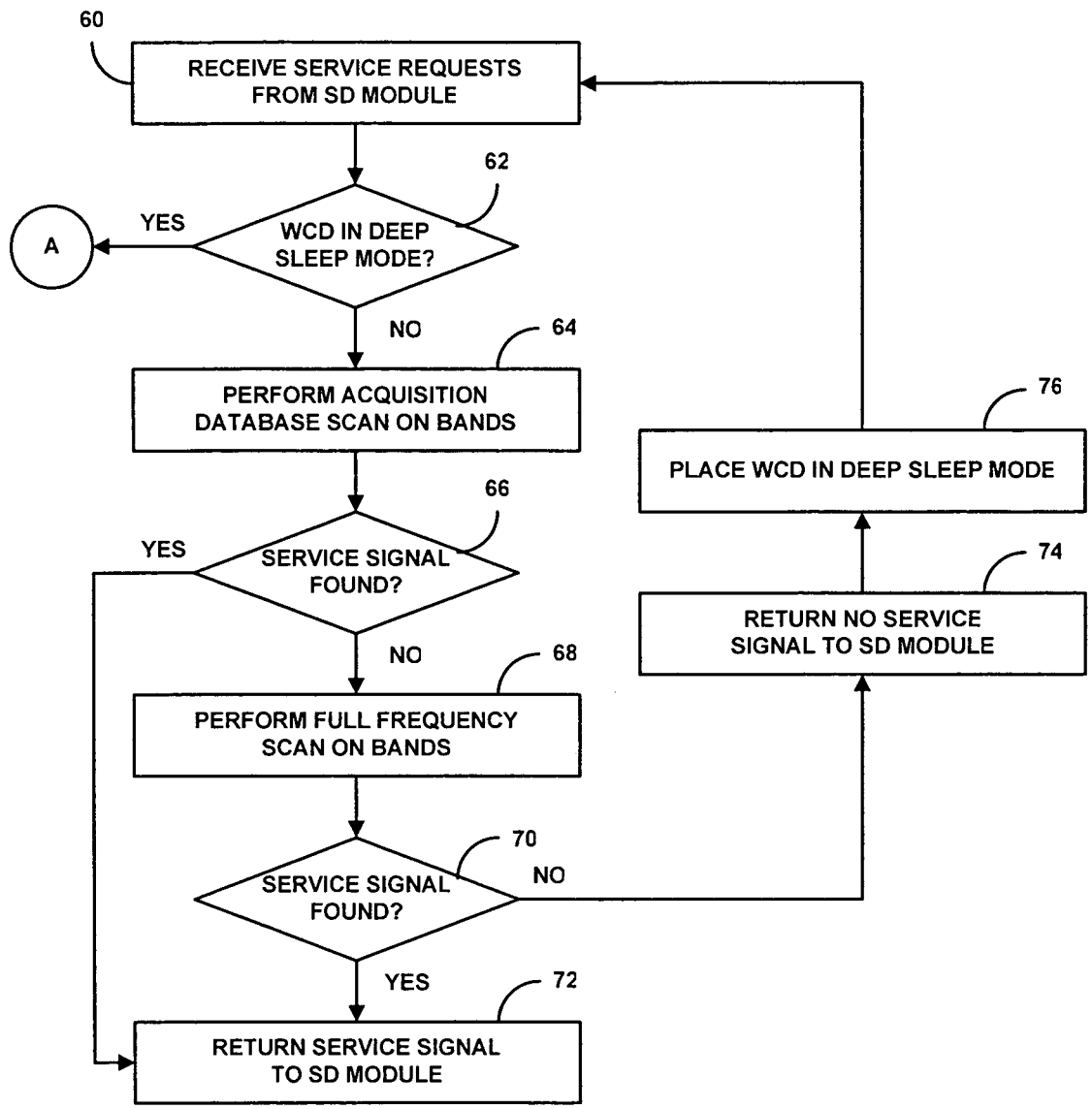
FIGS. 4A and 4B are flowcharts illustrating exemplary operation of an out-of-service wireless communication device in a deep sleep mode.
Figure 4B:
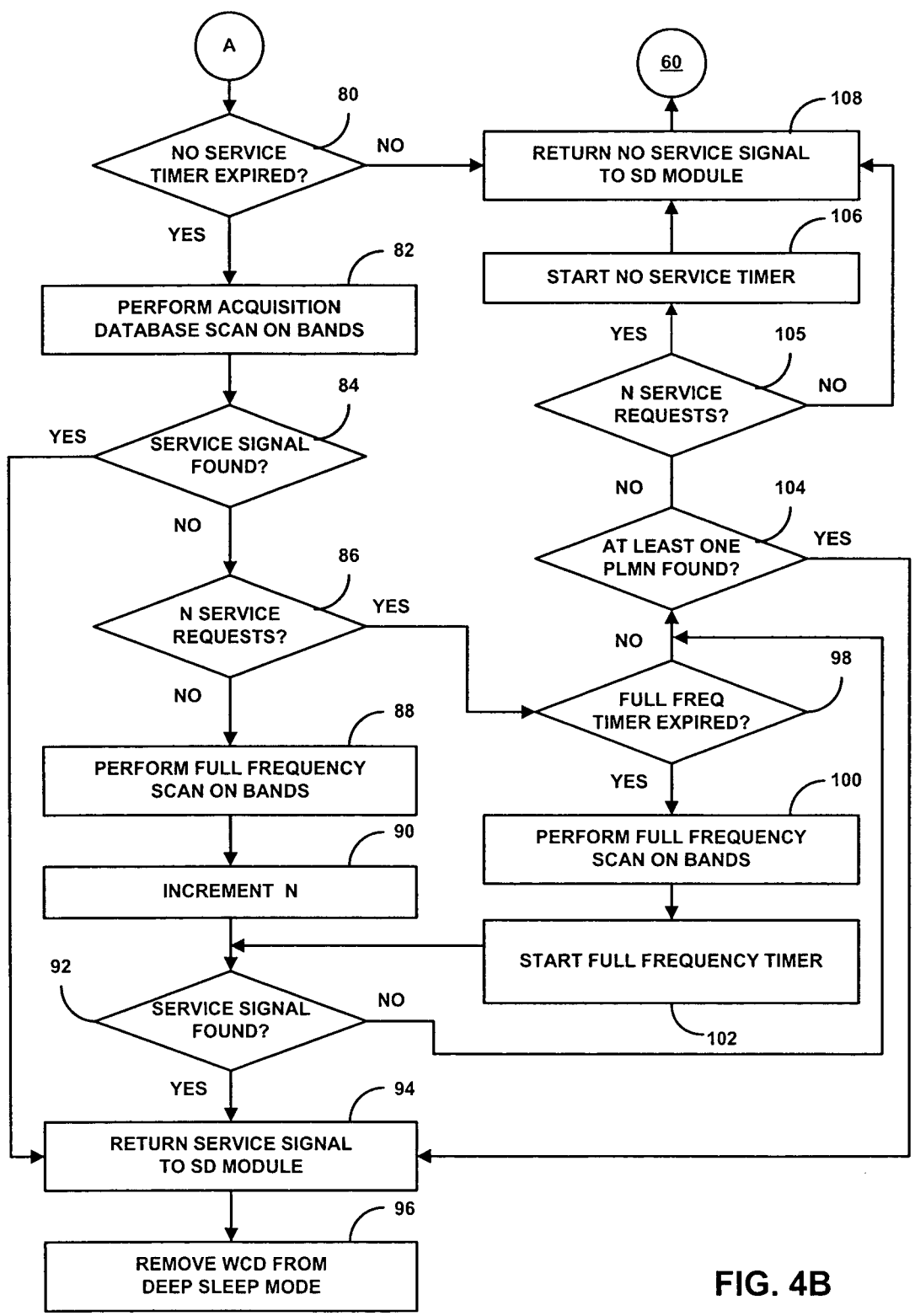

FIGS. 4A and 4B are flowcharts illustrating an example operation of WCD 16 in a deep sleep mode. The operation will be described herein in relation to controller 18 within WCD 16 from FIG. 2. Following power up or a loss of service, controller 18 receives service requests from system determination (SD) module 26 (60). The service requests may include an automatic service request and a limited service request if the automatic service request failed. The service requests may identify band groups that include one or more frequency bands supported by WCD 16 in which to perform a service signal search. The process described herein may be applied to each of the band groups separately or to all of the band groups at the same time.

Controller 18 determines whether WCD 16 is operating in the deep sleep mode (62). If WCD 16 is not in the deep sleep mode (no branch of 62), controller 18 performs an acquisition database scan on the supported frequency bands identified in the service requests from SD module 26 (64). Controller 18 may perform the acquisition database scan by instructing search module 24 to search for a service signal on channels of the identified frequency bands included in acquisition database 30. If a service signal is found from the acquisition database scan (yes branch of 66), controller 18 returns a service signal indication to SD module 26 to instruct WCD 16 to operate on the returned service signal (72).

If a service signal is not found from the acquisition database scan (no branch of 66), controller 18 performs a full frequency scan on the supported frequency bands identified in the service requests (68). Controller 18 may perform the full frequency scan by instructing search module 24 to search for a service signal on each channel of the identified frequency bands. If a service signal is found from the full frequency scan (yes branch of 70), controller 18 returns the service signal indication to SD module 26 to instruct WCD 16 to operate on the returned service signal (72). If a service signal is not found from the full frequency scan (no branch of 70), controller 18 returns a no service signal indication to SD module 26 (74). Controller 18 then places WCD 16 in the deep sleep mode (76). Controller 18 may then receive service requests from SD module 28 during wake-up periods while operating in the deep sleep mode (60). A timer may be set to cause controller 18 to wake-up at predefined intervals.

If WCD 16 is already operating in the deep sleep mode (yes branch of 62) at the time a service request is received, controller 18 determines whether no service timer 32 has expired (80), as shown in FIG. 4B. If no service timer 32 is still active, i.e., has not expired, controller 18 automatically returns a no service signal indication to SD module 26 (108) without performing any service signal searches. Controller 18 may then return WCD 16 to the deep sleep mode and continue to receive service requests from SD module 28 during the wake-up periods (60).

In some cases, as an alternative, controller 18 may determine that one or more of the frequency bands supported by WCD 16 were not searched since no service timer 32 last expired. Controller 18 may then perform an acquisition database scan on these unsearched frequency bands before no service timer 32 expires (82). If no service timer 32 has expired or was not active, controller 18 performs an acquisition database scan on the supported frequency bands of WCD 16 identified in the service requests (82).

If a service signal is found from the acquisition database scan (yes branch of 84), controller 18 returns the service signal indication to SD module 26 to instruct WCD 16 to operate on the returned service signal (94). Controller 18 then removes WCD 16 from the deep sleep mode (96). If a service signal is not found from the acquisition database scan (no branch of 84), controller 18 determines whether a predetermined number (N) of service requests for the supported frequency bands have been received from SD module 26 (86). In some cases, N may be approximately equal to twelve.

If N service requests have not been received from SD module 26, controller 18 performs a full frequency scan on the supported frequency bands identified in the service requests (88) and increments N (90). If N service requests have been received from SD module 26, controller 18 determines whether full frequency timer 34 has expired (98). If full frequency timer 34 has expired or was not active (yes branch of 98), controller 18 performs a full frequency scan on the supported frequency bands identified in the service requests (100) and starts full frequency timer (102). If a service signal is found from either full frequency scan (yes branch of 92), controller 18 returns the service signal to SD module 26 to instruct WCD 16 to operate on the returned service signal (94). Controller 18 then removes WCD 16 from the deep sleep mode (96), in which case WCD 16 may commence normal operation.

If full frequency timer 34 is still active (no branch of 98), controller 18 does not perform a full frequency scan even through the acquisition database scan was unsuccessful. In this manner, WCD 16 avoids excessive full frequency scans, which could result in excessive power consumption. In some cases, controller 18 may determine that one or more of the frequency bands supported by WCD 16 have not been scanned since full frequency timer 34 last expired. Controller 18 may then perform a full frequency scan on these unscanned frequency bands before full frequency timer 34 expires (100). Controller 18 may also perform a full frequency scan on frequency bands that do not have at least one channel included in acquisition database 30 before full frequency timer 34 expires (100).

If full frequency timer 34 is still active (no branch of 98) or if a service signal is not found from either full frequency scan (no branch of 92), controller 18 determines whether at least one PLMN has been found by the acquisition database scan or the full frequency scan (104). If at least one PLMN has not been found (no branch of 104), controller 18 again determines whether the predetermined number (N) of service requests for the supported frequency bands have been received from SD module 26 (105). If N service requests have been received from SD module 26, controller 18 starts no service timer 32 (106) and returns a no service signal indication to SD module 26 (108). If N service requests have not been received from SD module 26, controller 18 returns a no service signal indication directly to SD module 26 (108) without starting no service timer 32.

If at least one PLMN has been found (yes branch of 104), controller 18 returns the service signal to SD module 26 to instruct WCD 16 to operate on the returned service signal (94). Controller 18 then removes WCD 16 from the deep sleep mode (96), in which case WCD 16 may commence normal operation.

The techniques described herein may be implemented in hardware, software, firmware, or any combination thereof. Any features described as modules or components may be implemented together in an integrated logic device or separately as discrete but interoperable logic devices. If implemented in software, the techniques may be realized in part by a computer readable medium, such as memory device 36, comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

Various embodiments have been described. For example, techniques for performing service signal searches with reduced power consumption when a wireless communication device is operating out of service have been described. The techniques include placing the wireless communication device in a deep sleep mode and periodically entering a wake-up period during which power consumption is increased to perform service signal searches. Limiting the number of times service signal searches are performed reduces power consumption in the wireless communication device by reducing the amount of time the wireless communication device is awake. These and other embodiments are within the scope of the following claims.

The invention claimed is:

1. A method comprising:
   placing a wireless communication device in a deep sleep mode, in which the wireless communication device does not search for service signals;
   periodically increasing power in the wireless communication device to initiate one or more wake-up periods;
   performing a service signal search in one or more frequency bands supported by the wireless communication device during the wake-up periods, wherein performing the signal service search during the wake up periods comprises:
      performing an acquisition database scan for a service signal supporting the wireless communication device, the acquisition database scan comprising a database scan of preloaded channels and dynamically learned channels, wherein dynamically learned channels comprise channels added and updated by the wireless communication device on which the wireless communication device previously received service; and
      when the acquisition database scan is unsuccessful in locating signal service, performing a limited full frequency scan; and
   returning the wireless communication device to the deep sleep mode when the service signal search is unsuccessful;
   wherein the limited full frequency scan comprises performing a full frequency scan of frequency bands supported by the wireless communication device when less than a predetermined number of service requests for supported frequency bands has been received, and in situations when both:
      a quantity equal to or greater than the predetermined number of service requests for supported frequency bands has been received; and
      a full frequency timer has expired.

2. The method of claim 1, further comprising receiving one or more service requests during the wake-up periods that identify the one or more frequency bands in which to perform the service signal search.

3. The method of claim 1, wherein the supported frequency bands are divided into at least two band groups, the method further comprising receiving service requests during the wake-up periods that identify one of the band groups in which to perform the service signal search.

4. The method of claim 3, wherein receiving service requests comprises:
   receiving one or more initial service requests for one of the band groups; and
   receiving subsequent service requests for another one of the band groups when the service signal search based on the initial service requests is unsuccessful, wherein the initial service requests are received during a first wake-up period and the subsequent service requests are receiving during a second wake-up period.

5. The method of claim 3, wherein receiving the initial service requests comprises receiving a plurality of initial service requests for a high priority one of the band groups that includes channels on which the wireless communication device previously received service.

6. The method of claim 1, wherein performing the acquisition database scan comprises searching for a service signal on channels of the supported frequency bands included in the acquisition database.

7. The method of claim 6, wherein performing the service signal search comprises performing a full frequency scan on the supported frequency bands when the acquisition database scan is unsuccessful.

8. The method of claim 7, wherein performing the full frequency scan comprises searching for a service signal on each channel of the supported frequency bands.

9. The method of claim 7, wherein performing the full frequency scan comprises:
   performing a coarse frequency scan on the supported frequency bands;
   performing a fine frequency scan on the supported frequency bands; and
   performing a code space search on each channel of the supported frequency bands.

10. The method of claim 7, wherein performing the full frequency scan comprises performing the full frequency scan on the supported frequency bands only during periods permitted by a full frequency timer.

11. The method of claim 1, wherein periodically increasing power in the wireless communication device comprises increasing power in the wireless communication device to initiate the wake-up periods after operating the wireless communication device in the deep sleep mode for a predefined period of time.

12. The method of claim 1, wherein performing the acquisition database scan and full frequency scan on the supported frequency bands occurs for a predetermined number of service requests during the wake-up period.

13. The method of claim 12, further comprising starting a full frequency timer after the predetermined number of service requests, and performing the acquisition database scan on the supported frequency bands for service requests during the wake-up periods until the full frequency timer expires.

14. The method of claim 12, further comprising starting a no service timer after the predetermined number of service requests when no public land mobile networks are found during the service signal search, and automatically generating a no service indication until the no service timer expires.

15. The method of claim 1, further comprising generating a no service indication when the service signal search is unsuccessful, and generating a service indication when the service signal search is successful.

16. The method of claim 1, further comprising removing the wireless communication device from the deep sleep mode when the service signal search is successful.

17. The method of claim 1, wherein the wireless communication device supports communication according to a code division multiple access (CDMA) standard or a wideband CDMA (W-CDMA) standard.

18. A non-transitory computer-readable medium comprising instructions that cause a processor to:
　place a wireless communication device in a deep sleep mode, in which the wireless communication device does not search for service signals;
　periodically increase power in the wireless communication device to initiate one or more wake-up periods;
　perform a service signal search in one or more frequency bands supported by the wireless communication device during the wake-up periods, the service signal search comprising:
　　performing an acquisition database scan of preloaded channels and dynamically searched channels for a service signal supporting the wireless communication device, the acquisition database scan comprising a database scan of preloaded channels and dynamically learned channels, wherein dynamically learned channels comprise channels added and updated by the wireless communication device on which the wireless communication device previously received service; and
　　when the acquisition database scan is unsuccessful in locating signal service, performing a limited full frequency scan; and
　return the wireless communication device to the deep sleep mode when the service signal search is unsuccessful;
　wherein the limited full frequency scan comprises performing a full frequency scan of frequency bands supported by the wireless communication device when less than a predetermined number of service requests for supported frequency bands has been received, and in situations when both:
　　a quantity equal to or greater than the predetermined number of service requests for supported frequency bands has been received; and
　　a full frequency timer has expired.

19. The non-transitory computer-readable medium of claim 18, further comprising instructions that cause the processor to receive service requests during the wake-up periods that identify the one or more frequency bands in which to perform the service signal search.

20. The non-transitory computer-readable medium of claim 18, wherein the supported frequency bands are divided into at least two band groups, further comprising instructions that cause the processor to:
　receive initial service requests for one of the band groups during a first wake-up period; and
　receive subsequent service requests for another one of the band groups during a second wake-up period when the service signal search based on the initial service requests is unsuccessful.

21. The non-transitory computer-readable medium of claim 18, wherein the instructions that cause the processor to perform the service signal search cause the processor to perform an acquisition database scan on the one or more supported frequency bands in an acquisition database.

22. The non-transitory computer-readable medium of claim 21, wherein the instructions that cause the processor to perform the service signal search cause the processor to perform a full frequency scan on the supported frequency bands when the acquisition database scan is unsuccessful.

23. The non-transitory computer-readable medium of claim 18, further comprising instructions that cause the processor to perform both an acquisition database scan and a full frequency scan on the supported frequency bands for a predetermined number of service requests during the wake-up periods.

24. The non-transitory computer-readable medium of claim 23, further comprising instructions that cause the processor to start a full frequency timer after the predetermined number of service requests, and perform only an acquisition database scan on the supported frequency bands for service requests during the wake-up periods until the full frequency timer expires.

25. The non-transitory computer-readable medium of claim 23, further comprising instructions that cause the processor to start a no service timer after the predetermined number of service request when no public land mobile networks are found during the service signal search, and automatically return a no service signal until the no service timer expires.

26. The non-transitory computer-readable medium of claim 18, further comprising instructions that cause the processor to remove the wireless communication device from the deep sleep mode when the service signal search is successful.

27. The non-transitory computer-readable medium of claim 18, further comprising instructions that cause the processor to:
　generate a no service indication when the service signal search is unsuccessful; and
　generate a service indication when the service signal search is successful.

28. The non-transitory computer-readable medium of claim 18, wherein the wireless communication device supports communication according to a code division multiple access (CDMA) standard or a wideband CDMA (W-CDMA) standard.

29. A wireless communication device comprising a controller that:
　places a wireless communication device in a deep sleep mode, in which the wireless communication device does not search for service signals;
　periodically increases power in the wireless communication device to initiate one or more wake-up periods;
　performs a service signal search in one or more frequency bands supported by the wireless communication device during the wake-up periods, the service signal search comprising:
　　performing an acquisition database scan of preloaded channels and dynamically searched channels for a service signal supporting the wireless communication device, the acquisition database scan comprising a database scan of preloaded channels and dynamically learned channels, wherein dynamically learned channels comprise channels added and updated by the wireless communication device on which the wireless communication device previously received service; and when the acquisition database scan is unsuccessful in locating signal service, performing a limited full frequency scan; and returns the wireless communication device to the deep sleep mode when the service signal search is unsuccessful;

wherein the limited full frequency scan comprises performing a full frequency scan of frequency bands supported by the wireless communication device when less than a predetermined number of service requests for supported frequency bands has been received, and in situations when both:

a quantity equal to or greater than the predetermined number of service requests for supported frequency bands has been received; and a full frequency timer has expired.

30. The device of claim 29, further comprising a system determination module, coupled to the controller, that generates service requests within the wireless communication device during the wake-up periods, wherein the service requests identify the frequency bands in which to perform the service signal search.

31. The device of claim 29, further comprising a system determination module, coupled to the controller, that divides the supported frequency bands into at least two band groups, wherein the system determination module generates:

initial service requests for one of the band groups during a first wake-up period; and subsequent service requests for another one of the band groups during a second wake-up period when the service signal search based on the initial service requests is unsuccessful, wherein the initial and subsequent service requests identify the frequency bands in which to perform the service signal search.

32. The device of claim 29, wherein the initial service requests comprise service requests for a high priority one of the band groups that includes channels on which the wireless communication device previously received service, and the controller receives a plurality of consecutive service requests from the system determination module for the high priority one of the band groups.

33. The device of claim 29, further comprising a search module, wherein the acquisition database scan searches for a service signal on channels of the supported frequency bands included in the acquisition database within the device.

34. The device of claim 33, wherein the controller directs the search module to perform a full frequency scan on the supported frequency bands when the acquisition database scan is unsuccessful.

35. The device of claim 34, further comprising a full frequency timer coupled to the controller, wherein the controller directs the search module to perform the full frequency scan on the supported frequency bands when the full frequency timer expires.

36. The device of claim 29, further comprising a power supply coupled to the controller that provides increased power to the controller to initiate the wake-up periods after the controller operates the wireless communication device in the deep sleep mode for a predefined period of time.

37. The device of claim 29, further comprising a no service timer coupled to the controller, wherein the controller starts the no service timer when no public land mobile networks are found during the service signal search, and wherein the controller automatically provides a no service indication to a system determination module within the wireless communication device until the no service timer expires.

38. The device of claim 29, wherein the controller provides a no service indication to a system determination module within the wireless communication device when the service signal search is unsuccessful, and the controller provides a service indication to the system determination device when the service signal search is successful.

39. The device of claim 29, wherein the controller removes the wireless communication device from the deep sleep mode when the service signal search is successful.

40. The device of claim 29, wherein the wireless communication device supports communication according to a code division multiple access (CDMA) standard or a wideband CDMA (W-CDMA) standard.

41. A wireless communication device comprising:

means for placing a wireless communication device in a deep sleep mode, in which the wireless communication device does not search for service signals;

means for periodically increasing power in the wireless communication device to initiate one or more wake-up periods;

means for performing a service signal search in one or more frequency bands supported by the wireless communication device during the wake-up periods, the means for performing the service signal search comprising:

means for performing an acquisition database scan of preloaded channels and dynamically searched channels for a service signal supporting the wireless communication device, the acquisition database scan comprising a database scan of preloaded channels and dynamically learned channels, wherein dynamically learned channels comprise channels added and updated by the wireless communication device on which the wireless communication device previously received service; and means for performing a limited full frequency scan of all frequency bands supported by the wireless communication device operating when the acquisition database scan is unsuccessful in locating signal service; and means for returning the wireless communication device to the deep sleep mode when the service signal search is unsuccessful.

wherein the means for performing the limited full frequency scan comprises performing a full frequency scan of frequency bands supported by the wireless communication device when less than a predetermined number of service requests for supported frequency bands has been received, and in situations when both:

a quantity equal to or greater than the predetermined number of service requests for supported frequency bands has been received; and a full frequency timer has expired.

* * * * *